United States Patent [19]

Mucheyer

[11] Patent Number: 4,622,883
[45] Date of Patent: Nov. 18, 1986

[54] APPARATUS FOR POSITIONING A MOVABLE MEMBER

[75] Inventor: Norbert Mucheyer, Rechtenbach, Fed. Rep. of Germany

[73] Assignee: Mannesmann-Rexroth GmbH, Lohr am Main, Fed. Rep. of Germany

[21] Appl. No.: 820,680

[22] Filed: Jan. 21, 1986

[30] Foreign Application Priority Data

Feb. 2, 1985 [DE] Fed. Rep. of Germany ....... 3505275

[51] Int. Cl.$^4$ .......................................... F15B 13/042
[52] U.S. Cl. ........................................ 91/388; 91/403; 91/461
[58] Field of Search .................. 91/388, 403, 410, 461

[56] References Cited

U.S. PATENT DOCUMENTS 4,510,847  4/1985  Mucheyer et al. ............... 91/388 X
4,574,687  3/1986  Kauss et al. ...................... 91/388 X Primary Examiner—Gerald A. Michalsky
Attorney, Agent, or Firm—Walter C. Farley

[57] ABSTRACT

An apparatus for controlling the movement of a movable element as a working circuit (10) with a directional control valve (3) equipped to control devices (11, 12) which can be pressure activated in two directions. A control circuit (29) which can be connected to a fluid source (19) is used to activate the directional control valve for which the control circuit is connected to the two control devices and has an adjustable first choke (24) connected to one of the two control devices (12), a second choke (22) which is similarly adjustable and connectable to the same control device, and third and fourth adjustable chokes (27, 28) which are connectable to the other of the two control devices (11). The first and third chokes are connectable further to a storage tank (7) and the second and fourth chokes are further connectable to a pressure source. A proportioning pressure valve (45) can be connected to the other of the two control devices (11). The first and third chokes are connected to a pilot valve (38). To form a simple device with which the chokes connected in series as reference and current value elements, respectively, with as little line as possible, the proportioning pressure valve and the first and third chokes are separately connected to ports of the pilot valve. In one control position, the pilot valve interconnects the first and second chokes and connects the proportioning pressure valve to the third choke. In the other control position, the first and second chokes are interconnected through a fifth choke and the third and fourth chokes are connected directly. The proportioning pressure valve is designed as a leak-proof valve.

5 Claims, 2 Drawing Figures

APPARATUS FOR POSITIONING A MOVABLE MEMBER

This invention relates to an apparatus for controlling the positioning of a movable member.

BACKGROUND OF THE INVENTION

In an existing device of this general type, disclosed in U.S. Pat. No. 4,510,847, a proportioning pressure valve acts through a choke on one of the control devices which operates a multiple position control valve. When the choke is open, two other chokes which are similarly connected to this control device do not operate. In this way, the operating mode is set without deactivating first and second chokes. The proportioning pressure valve includes a valve piston which is subject to leakage. This necessitates connecting the proportioning pressure valve to a storage tank.

BRIEF DESCRIPTION OF THE INVENTION

An object of the present invention is to provide a simple device for controlling the positioning of a movable member in which chokes are connected in series as actual value and desired or reference value elements and can be actuated in the desired manner with as little line capacity as possible.

Briefly described, the apparatus of the invention controls the position of a positionable member in response to a command signal and an actual value signal and includes a bidirectionally operable multi-way valve for controlling the flow of fluid under pressure from a fluid pressure source to the positionable member, the valve including pressure responsive control devices for actuating the valve. Four chokes which are adjustable during operation are included in the system along with a fifth choke having a passageway area which can be adjusted but not during operation of the apparatus. The first choke has one side connected to a first one of the control devices. The third choke is connected to the second control device, the first and third chokes being actual value transmitters. The fourth choke is coupled to the second choke so that the second and fourth chokes are concurrently adjustable in opposite directions and are connectable to the source of fluid under pressure. An externally leak-proof proportioning pressure valve is connectable to the source and a selectively movable switching valve which has a plurality of ports is selectively manually movable to either of two positions. The ports of the switching valve are connected to the chokes and the proportioning valve so that, in the first position, the first and second chokes are connected in series and the first control device is connected to the junction between those chokes, the proportioning valve being connected to the second control device and the third choke. In the second position, the first and second chokes are connected in series with the fifth choke and with each other with the first control device being connected to the junction between the first and second chokes, the third and fourth chokes being connected in series with each other and the second control device is connected to the junction between the third and fourth chokes, the proportioning valve being disconnected from the control devices.

The reference element is a relatively simple design in that it contains the second and fourth chokes and the pilot or switching valve for switching the operation mode. To control the position of the movable member using the first and second chokes, the proportioning pressure valve is connected to the third choke which can be adjusted according to the current value of the force exerted by the movable member. The cross-sectional changes of the third choke thus have very little influence on the control circuit. If the force acting on the movable member is to be regulated, the proportioning pressure valve is cut off and the action of the first and second chokes is greatly restricted. Functionally, mixed force-location control results. The proportioning pressure valve requires no leak line and is less expensive in its design than a valve with step pistons. This contributes to further simplification of the device.

A particular structure of a leak-proof proportioning valve which can be fabricated rather simply is disclosed.

BRIEF DESCRIPTION OF THE DRAWINGS

In order to impart full understanding of the manner in which these and other objects are attained in accordance with the invention, particularly advantageous embodiments thereof will be described with reference to the accompanying drawings, which form a part of this specification, and wherein.

DETAILED DESCRIPTION OF PREFERRED EMBODIMENTS

The invention will be described in the context of a device for regulating the lifting mechanism of a tractor with an upper connecting rod and a lower connecting rod as a practical example of the utility of the invention.

Figure 1:
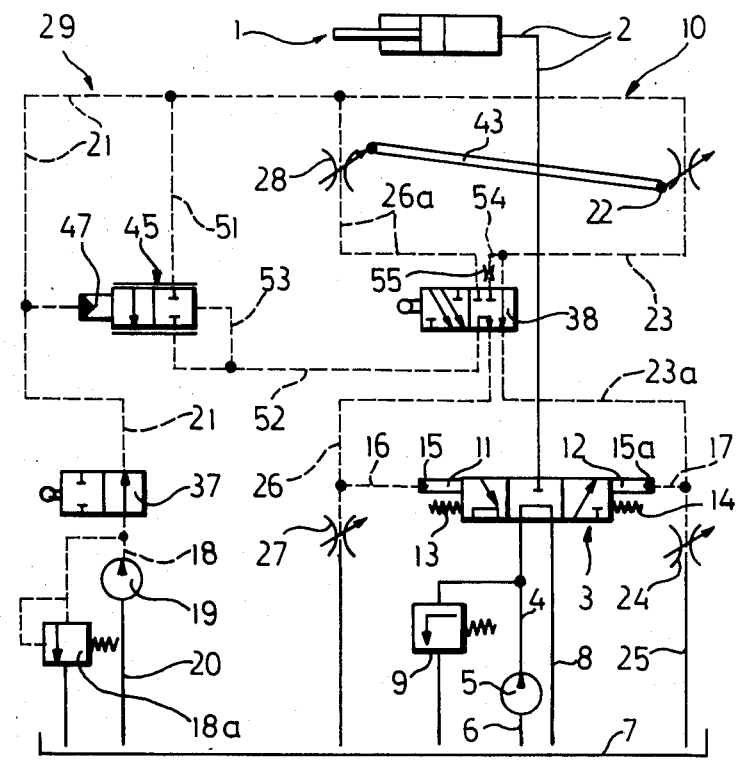
FIG. 1 shows a fluid circuit diagram of a control apparatus in accordance with the invention for controlling the position of a movable member.

The movable member, which is shown in FIG. 1 as being a simple power cylinder which determines the position of the lifting mechanism and the force exerted by it, is connected through a fluid line 2 to a 3-position, 3-port directional control valve which can be actuated in either of two directions by control pressure. A pump 5 is connected through a line 4 to the control valve 3. The intake line 6 for the pump extends into a storage tank 7. A further port of valve 3 is connected through a line 8 to tank 7. Line 4 is also connected to a relief valve 9 the outlet side of which leads to the storage tank 7. Components 1–9 can be regarded as forming a working circuit indicated generally at 10.

Bidirectional control valve 3 has control devices 11 and 12 on opposite sides thereof to actuate the movable piston of the control valve, not separately shown. When pressurized by pressure medium (liquid or gas), the control devices tend to displace the movable piston of valve 3 against the action of the control springs 13 and 14, the control devices each acting in the direction of the arrows 15 and 15a illustrated in the control devices 11, 12. The two control springs 13, 14 attempt to keep the piston in its central position when the control devices are not pressurized. Control line 16 is connected to control device 11 and control line 17 is connected to control device 12.

One control line 18 is connected to the delivery side of a control pump 19, the intake line of which is connected to storage tank 7. A relief valve 18a is connected to control line 18. Control line 21, which leads to an adjustable choke 22, is connected to control line 18 through a two-position, two-port manually operable control valve 37 which can be actuated at will. Control line 23 leads from adjustable choke 22 to a pilot or switching valve 38. One side of an adjustable choke 24 is connected to storage tank 7 through line 25, the other side of the choke being connected to switching valve 38 by a control line 23a which is also connected with control line 17.

An adjustable choke 27 and switching valve 38 are connected to control line 16 through line 26. Switching valve 38 is connected to adjusting choke 28 through control line 26a. The side of adjustable choke 27 which faces away from control line 26 is connected to the storage tank and the side of adjustable choke 28 facing away from control line 26a is connected to control line 21. The control circuit is indicated generally as 29. Adjustable chokes 24, 22, 27 and 28 will be referred to herein as the first, second, third and fourth chokes, respectively.

Adjustable chokes 22 and 28 are interconnected by a mechanical member 43 in opposition (i.e., concurrently are adjusted in opposite directions when member 43 is moved) and function as reference or set value elements to select the location of the movable member 1 or the force exerted by it. Adjustable choke 24 is designed as a controlled variable transducer (current or actual value element) mechanically connected to the moving part of the movable member. This transducer is adjusted according to the actual position of element 1. Adjustable choke 27 is set by a converter (not shown) as a function of the force acting on the movable member. To achieve equilibrium in the piston in the adjusted state, control device 11 preferably exhibits the same cross-section as control device 12.

Figure 2:
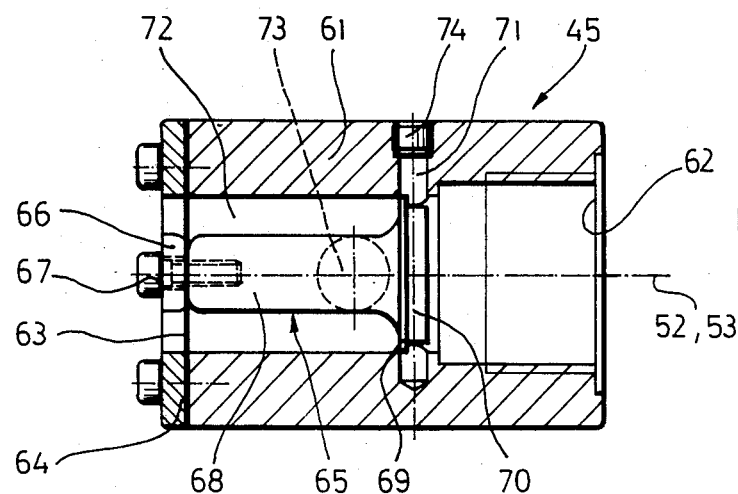
FIG. 2 is a longitudinal section through a proportioning pressure valve of the type used in the circuit of FIG. 1.

A proportioning pressure valve 45, constructed in accordance with FIG. 2, has a fluid pressure control device 47 which is connected to control line 21. On one side control line 21 is connected through a line 51 to the proportioning pressure valve and a line 52 is connected between the proportioning pressure valve 45 and switching valve 38. A control line 53, connected to control line 52, acts in opposition to the force exerted by control device 47.

A further line 54 interconnects line 23 and a port of switching valve 38 and contains a choke 55 which can be adjusted if desired and if necessary but which is rigidly set and not adjustable during operation.

Switching valve 38 is designed as a six-port, two-position directional control valve which can be actuated manually at will. In the position of the movable portion of valve 38 shown in FIG. 1, control lines 23 and 23a are interconnected as are control lines 26 and 52. Thus, in that position, the first and second adjustable chokes 24, 22 are connected in series with each other with the junction between those chokes being connected to control device 12. In the other control position of valve 38, lines 54 and 23a are interconnected as are lines 26 and 26a. Thus, in that position, the first and second chokes are connected in series with the fifth choke 55, the first choke still being connected to control device 12, and the third and fourth chokes are also connected in series with each other with the junction therebetween connected to control device 11. Proportional valve 45 is thus isolated from the circuit and plays no part in its operation.

Thus, the operating mode of the device can be changed or selected using valve 38. In the position of the piston shown in FIG. 1, cross-sectional changes of choke 27 have no influence on the control circuit. The position of the movable member is controlled by chokes 22 and 24 as the reference element and actual value element, respectively.

If the force exerted by element 1 is to be regulated, proportioning pressure valve 45 is isolated from the circuit by moving the piston of valve 38 into its other control position. In that position, fourth and third chokes 28 and 27 are then connected in series and function as the reference and actual value elements, respectively. Choke 55, connected between series connected chokes 22 and 24, restricts the flow such that chokes 22, 24 have almost no effect on the control of movable element 1. The cross-section of choke 55 is adjusted so that the cross-section of choke 24 has the same cross-section as choke 22 roughly in the horizontal position of the lower connecting rod of the lifting apparatus of the tractor. In terms of action, mixed force-location control is achieved while the full sensitivity of the power circuit is preserved.

The proportioning pressure valve 45 shown in FIG. 2 has a cylindrical housing 61 with an internally threaded portion 62 at the right end thereof to form a fluid outlet connection. At the left side of the figure a membrane 63 is attached to the end face of housing 1 by a clamping ring 64. Within the left side of housing 61 is a cylindrical member 72. A valve member 65 is mounted at the center of the membrane using an outside counter-body 66 and a screw 67. The effective outside diameter of membrane 63 matches the orifice diameter of housing 61 (the diameter of chamber 72) in the membrane region. The diameter of shaft 68 of valve member 65 is such that the hydraulically active area of the membrane corresponds to one-half of the area of the orifice in housing 61.

A control flange 69 is mounted on the end of the shaft of valve member 65 opposite that to which the membrane is attached. The outer diameter of flange 69 corresponds to the diameter of the orifice in housing 61 to the left side of control flange 69. An offset portion 70 is formed on the side of the control flange 69 which faces away from membrane 63. A metering orifice 71 extends diametrically across the housing perpendicular to the axis thereof and defines a metering edge which is used as a flow transition between chamber 72 surrounding valve member 65 and the chamber leading to connection 62, chamber 72 being connected to an orifice 73 to control line 51 which leads to control line 21 and also functions as pressure control 47. Outlet 62 is connected to both of control lines 52 and 53, combined into one line. Metering orifice 71 is isolated from the outside by screw plug 74. The output pressure of proportioning pressure valve 45 is thus half of its input pressure.

In the position of control flange 69 shown in FIG. 2, its left side, as shown, matches the edge of metering orifice 71 adjacent to membrane 63. Orifice 73 is located some distance from control flange 69. If pressure builds up in chamber 72, valve member 65 is moved toward connection 62 so that, in the region of metering orifice 71, hydraulic fluid flows around control flange 69 into the other chamber and into connection 62. Control flange 69 is sufficiently thick in the axial direction such that, considering the cross-section of metering orifice 71, even with maximum opening of proportioning pressure valve 45 there is still a connection between chamber 72 and outlet 62. The thickness of flange 69 axially should also be only so great that when shaft 68 moves radially in the region of membrane 63, jamming of the control flange with the chamber wall of chamber 72 does not occur.

While certain advantageous embodiments have been chosen to illustrate the invention, it will be understood by those skilled in the art that various changes and modifications can be made therein without departing from the scope of the invention as defined in the appended claims.

What is claimed is:

1. An apparatus for controlling the position of a positionable member in response to a command signal and an actual value signal comprising the combination of bidirectionally operable multi-way valve means for controlling the flow of fluid under pressure from a source of fluid under pressure to the positionable member, said valve means including first and second pressure-responsive control devices for actuating said valve means;

an adjustable first choke having one side connected to said first control device;

an adjustable second choke;

an adjustable third choke connected to said second control device, said first and third chokes being actual value transmitters;

an adjustable fourth choke coupled to said second choke so that said second and fourth chokes are concurrently adjustable in opposite directions, said second and fourth chokes being connectable to said source;

a fifth choke;

an externally leak-proof proportioning pressure valve connectable to said source; and a selectively movable switching valve having a plurality of ports, said ports being respectively connected to each of said chokes and said proportioning valve, said switching valve being selectively movable to either of two positions comprising a first position in which said first and second chokes are connected in series with said first control device being connected to the junction therebetween, and said proportioning valve is connected to said second control device and said third choke, and a second position in which said first and second chokes are connected in series with said fifth choke and with each other with said first control device being connected to the junction between said first and second chokes, and said third and fourth chokes are connected in series with each other with said second control device being connected to the junction therebetween, with said proportioning valve being disconnected from said control devices.

2. An apparatus according to claim 1 wherein said first and third chokes have substantially the same maximum passage area and are concurrently adjustable in the same direction.

3. An apparatus according to claim 1 wherein said proportioning valve comprises a body;

means including a membrane defining a chamber in said body, said membrane separating said chamber from the ambient atmosphere;

a valve member supported by said membrane and having a valve surface;

means defining a metering edge for cooperating with said valve surface to control fluid flow into and out of said chamber as said valve member moves with said membrane.

4. An apparatus according to claim 3 wherein said valve surface comprises a control flange guided in said chamber, a transverse metering orifice intersecting said metering edge and cooperating with said flange.

5. An apparatus according to claim 4 wherein said means defining said chamber includes a cylindrical wall shaped to receive and guide said flange, said wall terminating after said metering edge, said flange having sufficient axial thickness so that said flange does not interfere with said wall upon radial movement of said valve member.

* * * * *